Feb. 8, 1927.  
C. GREEN  
1,617,210  
WHEEL FOR ROAD VEHICLES  
Filed Aug. 21, 1924

INVENTOR  
C. Green

Patented Feb. 8, 1927.

1,617,210

UNITED STATES PATENT OFFICE.

COLLINGWOOD GREEN, OF BOLTON, ENGLAND.

WHEEL FOR ROAD VEHICLES.

Application filed August 21, 1924, Serial No. 733,421, and in Great Britain March 13, 1924.

This invention relates to improvements in vehicle wheels having a continuous outer ring and pneumatic hubs or cushions such as described in my prior U. S. Patent No. 1,472,594, dated October 30, 1923.

It consists in supplying air under pressure to the part of the wheel between the hub part and the outer part carrying the felloe and also if desired to the annular chambers enclosed by the annular strips of leather or other flexible material.

The invention will be described with reference to the accompanying drawings.

The hub A and outer part B carrying the felloe are connected together by annular strips of leather or other material C of U or approximately U shape in cross section and arranged in pairs to form annular chambers $c$ having a radial flange $A^1$ between them, and plates D, $D^1$ at the front and back of the wheel are affixed to the part B carrying the felloe and a cap E is affixed to the front plate as described in my prior Patent No. 1,472,594.

Figure 1:
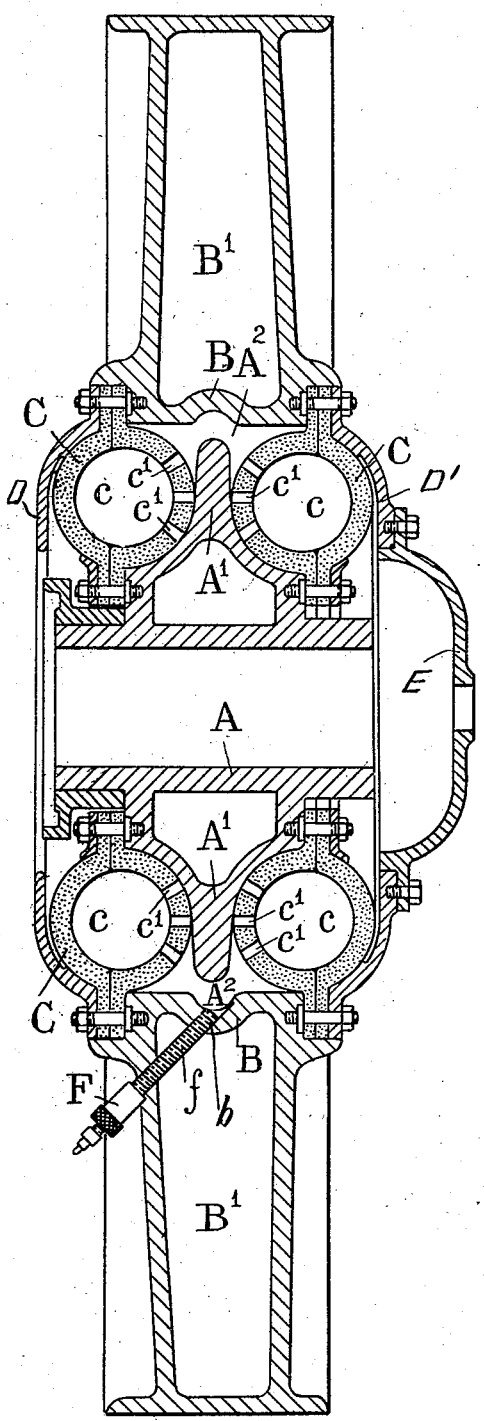
Fig. 1, is a vertical section through a wheel showing one form of the invention.

In the form of the invention shown in Fig. 1, an aperture $b$ is formed in the inner peripheral portion of the outer part B to receive a tube $f$ which passes out through one of the side portions of the part B being provided with an air valve F adapted to receive an air pump for supplying air under pressure to the annular space $A^2$ between the radial flange $A^1$ and the part B. The inner strips C, those adjacent to the radial flange $A^1$, are formed with apertures $c^1$ to allow the air pumped into the annular chamber $A^2$ to penetrate into the interior of the annular chambers $c$.

Figure 2:
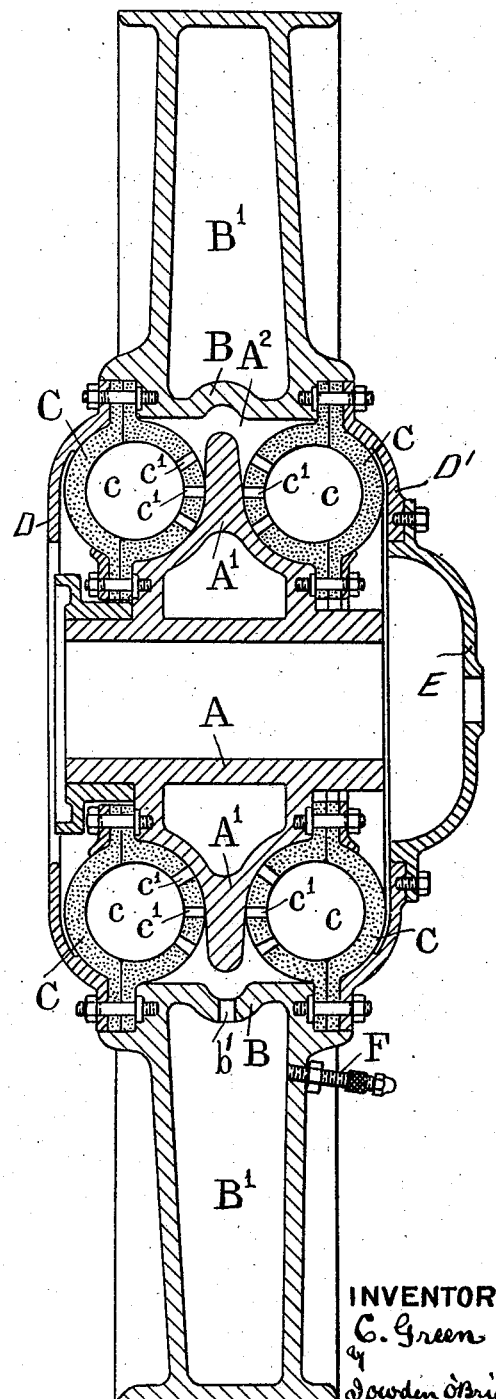
Fig. 2, is a vertical section through a wheel showing a further form of the invention.

In the form of the invention shown in Fig. 2, the valve F may be placed in one of the side portions of the part B, and an aperture $b^1$ or a series of apertures $b$ formed in the inner peripheral portion thereof. In this case air under pressure is supplied to the space $B^1$ in the part B as well as to the space $A^2$ and the chambers $c$.

What I claim as my invention and desire to protect by Letters Patent is:—

In a vehicle wheel of the type referred to, the combination with a hub part, an outer part spaced therefrom and carrying the felloe, two pairs of annular strips of pliable material connecting the two parts together and forming therewith an enclosed space, and a central flange on the hub part projecting outwards between the pairs of annular strips and by contact therewith forming a guide for the relative radial movement of said two parts, of a valve for supplying air under pressure to the enclosed space between the outer part and the hub part.

In testimony whereof I have hereunto set my hand.

COLLINGWOOD GREEN.